United States Patent [19]
Tart

[11] Patent Number: 5,096,021
[45] Date of Patent: Mar. 17, 1992

[54] TIRE CHOCK INTERLOCK SYSTEM FOR A GAS TRUCK

[76] Inventor: Charles Tart, Rte. 5, Box 15, Dunn, N.C. 28334

[21] Appl. No.: 696,868

[22] Filed: May 8, 1991

[51] Int. Cl.$^5$ .............................................. B60T 1/04
[52] U.S. Cl. .................................. 188/32; 188/151 A
[58] Field of Search ..................... 188/32, 151 A, 2 R, 188/62, 36, 111, 110; 414/401; 303/18; 141/98, 311, 392, 18, 94; 410/30

[56] References Cited

U.S. PATENT DOCUMENTS

| | | | |
|---|---|---|---|
| 3,517,776 | 6/1970 | Corti et al. | 188/32 X |
| 3,722,631 | 3/1973 | Lowrie | 188/32 X |
| 4,676,344 | 6/1987 | Locicero | 188/32 |
| 4,739,863 | 4/1988 | Stauffer | 188/32 |
| 4,969,792 | 11/1990 | Ellis et al. | 188/32 X |

*Primary Examiner*—Douglas C. Butler
*Attorney, Agent, or Firm*—Rhodes, Coats & Bennett

[57] ABSTRACT

The present invention entails a method and a system for chocking at least one wheel of a gas truck to assure that the gas truck is not driven away from a loading station while one or more gas hose nozzles from a storage tank are connected to a tank carried by the gas truck. The tire chock interlock system of the present invention includes a tire chock assembly that is stationed adjacent a loading platform or station and includes a chock that is movable from an extended position where the same aligns with and chocks a wheel associated with the gas truck to a retracted position away from that particular wheel leaving the gas truck free to move from the loading station. A pair of nozzle cradles are provided adjacent the loading station. When not being used to fill the tank of a gas truck, the hose nozzles from a main storage tank rest on the cradle. The interlock system of the present invention senses the presence of both gas hose nozzles on the cradle and accordingly maintains the tire chock in a retracted position. But if either cradle is not occupied by a hose nozzle, then the interlock system is operative to move the chock to a wheel locking or chocking position with respect to the gas truck and maintains that chock in that position until both cradles have received a gas hose nozzle. This assures that the gas truck cannot be driven away from the loading station while one or more hose nozzles remain connected to the tank of the gas truck.

11 Claims, 5 Drawing Sheets

5,096,021

TIRE CHOCK INTERLOCK SYSTEM FOR A GAS TRUCK

FIELD OF INVENTION

The present invention relates to gas transfer systems between a primary storage tank and a gas truck, and more particularly to an interlock system for preventing the inadvertent movement of a gas truck from a loading station while one or more supply hoses from the storage tank is connected to the tank of the gas truck.

BACKGROUND OF THE INVENTION

To load a propane gas truck, the gas truck is usually driven onto a loading platform or a loading pad adjacent a large storage or supply tank. A pair of hoses, one being a liquid hose and the other being a return hose, are pulled from the storage tank and coupled to the tank carried by the gas truck. Once the gas truck's tank has been filled, the hoses are uncoupled from the tank carried by the truck and the gas truck is driven away.

Over the years, there have been numerous accident caused by the driver driving the gas truck from the loading station without uncoupling both hose nozzles from the vehicle tank. This happens despite established procedure that most gas distribution businesses have established to protect the safety of the driver, people in the vicinity, and the environment. For example, many gas businesses insist that the driver block or chock the gas truck wheels on the passenger side before attaching the hose nozzles to the vehicle tank. Also, the driver is instructed to pass around the rear of the gas truck when he or she is to remove the chock from the vehicle wheel. Thus, if the driver in fact follows this procedure, he will most likely note that there remains one or more hose nozzles coupled to the vehicle tank. But past accidents have shown that drivers do not always follow these procedures and that these procedures are not foolproof. Even in spite of the many precautions that are given to drivers and despite set procedures as set forth above, there are still situations where serious accidents have been caused by the driver driving the gas truck away from the loading station while one or more hose nozzles remains coupled to the vehicle tank. In many cases, the result of a gas truck driving away while a hose nozzle is coupled to the vehicle tank is that a valve or other part of the vehicle tank is pulled or broken from the tank causing gas to spill out onto the loading station and in and around the storage tank. This presents a very dangerous situation because any type of spark or fire can set off a large explosion and fire.

Therefore, there exists a need for a foolproof system that will assure that a gas truck cannot be driven away from a storage tank while one or more gas hoses are coupled to the vehicle tank.

SUMMARY AND OBJECTS OF THE INVENTION

The present invention entails a chock interlock system for preventing a gas truck from driving away from a loading station while one or more gas hoses are coupled to the vehicle tank. In particular, the present interlock system is designed around a pair of nozzle cradles that normally hold a pair of gas nozzles when they are not coupled to the vehicle tank. The interlock system of the present invention effectively senses whether the two hose nozzles are in the two cradles. If either cradle is empty or not occupied with the hose nozzle, then a chock block is pushed to a wheel locked or blocked position. By the same token, when the interlock system senses and determines that there is a hose nozzle in each cradle, then and only then will the chock block retract out of the path of the wheel and free the gas truck to move from the loading pad or area.

It is therefore an object of the present invention to provide a foolproof chock interlock system for a gas loading area that will effectively prevent a gas truck from driving off the loading station or platform while a hose is coupled to the vehicle tank.

Another object of the present invention resides in a chock interlock system of the character referred to above that is reliable, durable and dependable.

A further object of the present invention is to provide a chock interlock system of the character referred to above that can be substantially powered by air.

Still a further object of the present invention resides in the provision of a chock interlock system for a gas loading ramp or pad wherein the interlock system senses whether the hose nozzles are located in a selected location away from the gastruck and will only permit the gas truck to exit from the loading station when the gas nozzles are placed in a selected location.

Another object of the present invention resides in the provision of a chock interlock system that is disposed on one side of the loading station and whereinthe chock is moved from an inoperative position on one side of the gas truck and the loading station to an operative or locking position where the chock rest directly in front of one wheel of the gas truck.

Other objects and advantages of the present invention will becomeapparent and obvious from a study of the following description and the accompanying drawings which are merely illustrative of such invention.

DETAILED DESCRIPTION OF THE INVENTION

Figure 1:
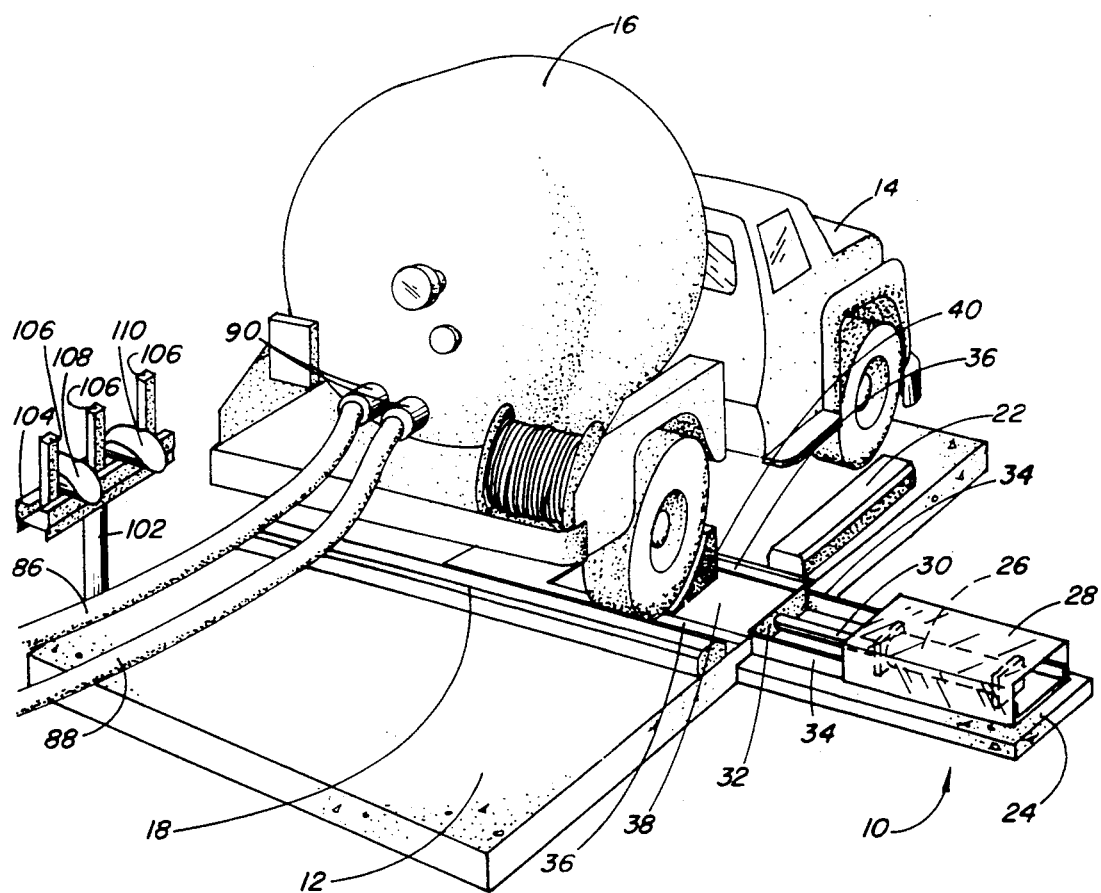
FIG. 1 is a perspective view of the chock interlock system of the present invention showing a gas truck that has been appropriately chocked by the interlock system of the present invention.

With further reference to the drawings, the chock interlock system of the present invention is shown therein. Before discussing the chock interlock system in detail, it should be pointed out that this system is designed to work in conjunction with a conventional propane gas truck 14 having a holding tank 16 mounted thereon.

Now turning to a discussion of the chock interlock system of the present invention, it is seen from the drawings that there is provided a loading station or area 12 for receiving the gas truck 14 that is positioned in close proximity to a storage or supply tank 13. (FIG. 3) Loading station 12 includes a rear stopping block or curb 18. Stopping block 18 will effectively position the gas truck 14 lengthwise on the loading pad 12. In addition, loading pad 12 includes a pair of side curbs 20 and 22. Disposed adjacent the loading pad 12 is a side pad 24 that receives and supports portions of the tire chock assembly indicated generally by the numeral 10.

Figure 2:
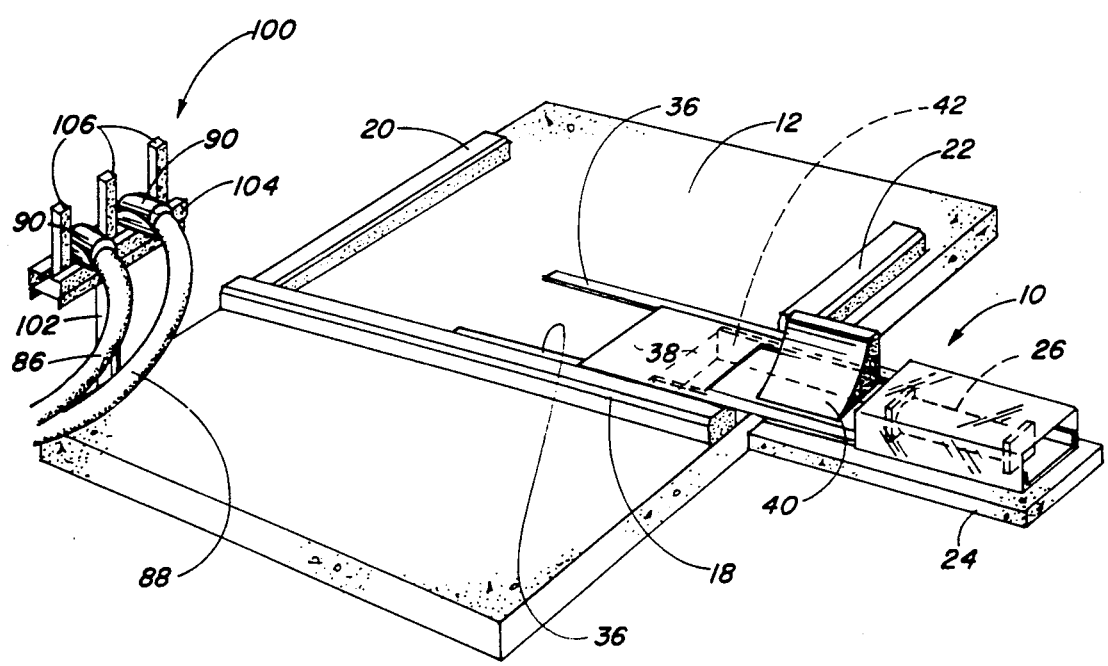
FIG. 2 is a perspective view of the chock interlock system of the present invention.

Viewing the tire chock assembly 10 in more detail, it is seen that the same includes a double acting air cylinder 26 that is mounted within a housing structure 28. Both the double acting air cylinder 26 and housing 28 are mounted on the side pad 24. Extending from the double acting air cylinder 26 is a rod 30 that is connected to a pusher plate 32. Pusher plate 32 is in turn connected to a main carrier plate 38. Carrier plate 38 rests on a pair of main guide rails 36 that are disposed on the loading pad 12. Secured on the carrier plate 38 is a chock block 40. Also, as seen in FIGS. 1 and 2, there is a u-shaped channel iron structure that enters through housing 28 and rests on side pad 24 and which defines a pair of upstanding guide rails 34 that support the carrier plate 38 when the same is retracted over the side pad 24. Also as shown in the drawings, a portion of the loading pad 12 adjacent the side pad 24 is provided with a trough structure 42. Trough 42 formed in the side of the loading pad 12 is adaopted to receive pusher plate 32 when the same penetrates the plane of the loading pad 12.

Figure 6:
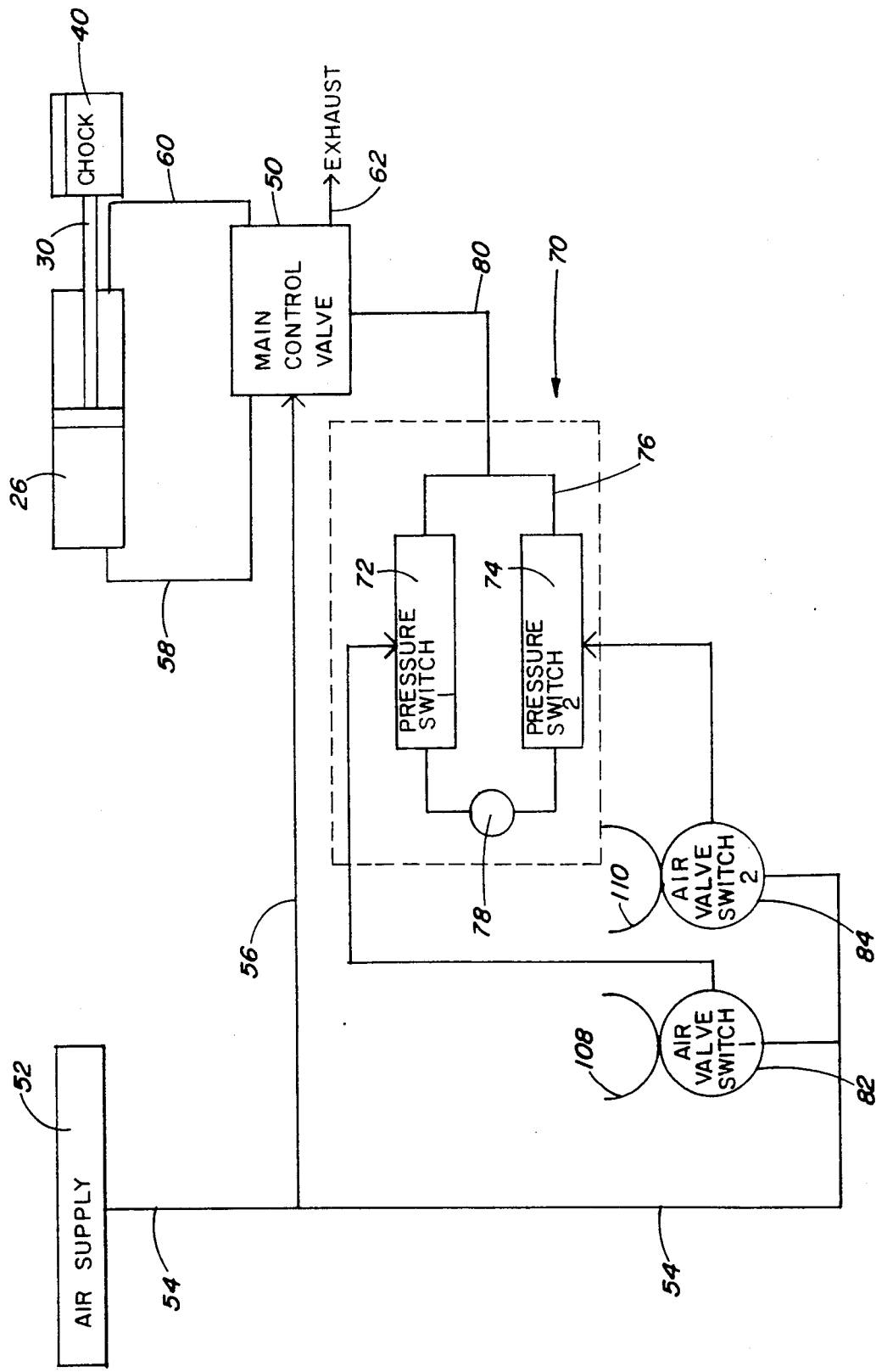
FIG. 6 is a schematic illustration of the chock interlock system of the present invention.

Turning to FIG. 6, there is shown therein control means for control means for controlling the pneumatic double acting cylinder 26. The control means includes a conventional electrically actuated two-position control valve 50. Main control valve 50 is connected to an air supply 52 through lines 54 and 56. Also, main control valve 50 includes two supply/return lines 58 and 60 that connect the main control valve with opposed ends of the pneumatic cylinder 26. Finally, main control valve 50 includes an exhaust line 62 for exhausting air being returned through the control valve from the cylinder 26.

Operatively connected to the main control valve 50 is an actuator circuit indicated generally by the numeral 70. Actuator circuit 70 includes a power source 78 and a pair of pressure switches 72 and 74. Pressure switches 72 and 74 are coupled together by line 76 which in turn is connected to an output line 80 that is connected to main control valve 50. main control valve 50 normally assumes a position where line 60 is pressurized and accordingly the chock 40 is moved to a retracted position. See FIGS. 2 and 3. However, the actuation of pressure switch 72 or 74 will actuate main control valve 50 and shift the same such that line 58 is pressurized and rod 30 of pneumatic cylinder 26 is extended. See FIG. 1. It is appreciated that in either case, air within either end of the cylinder 26 will be exhausted through exhaust line 62.

To actuate pressure switches 72 and 74, there is provided a pair of air switches 82 and 84. Each air switch 82 and 84 is normally open and is connected to the air supply 52 through line 54.

Figure 3:
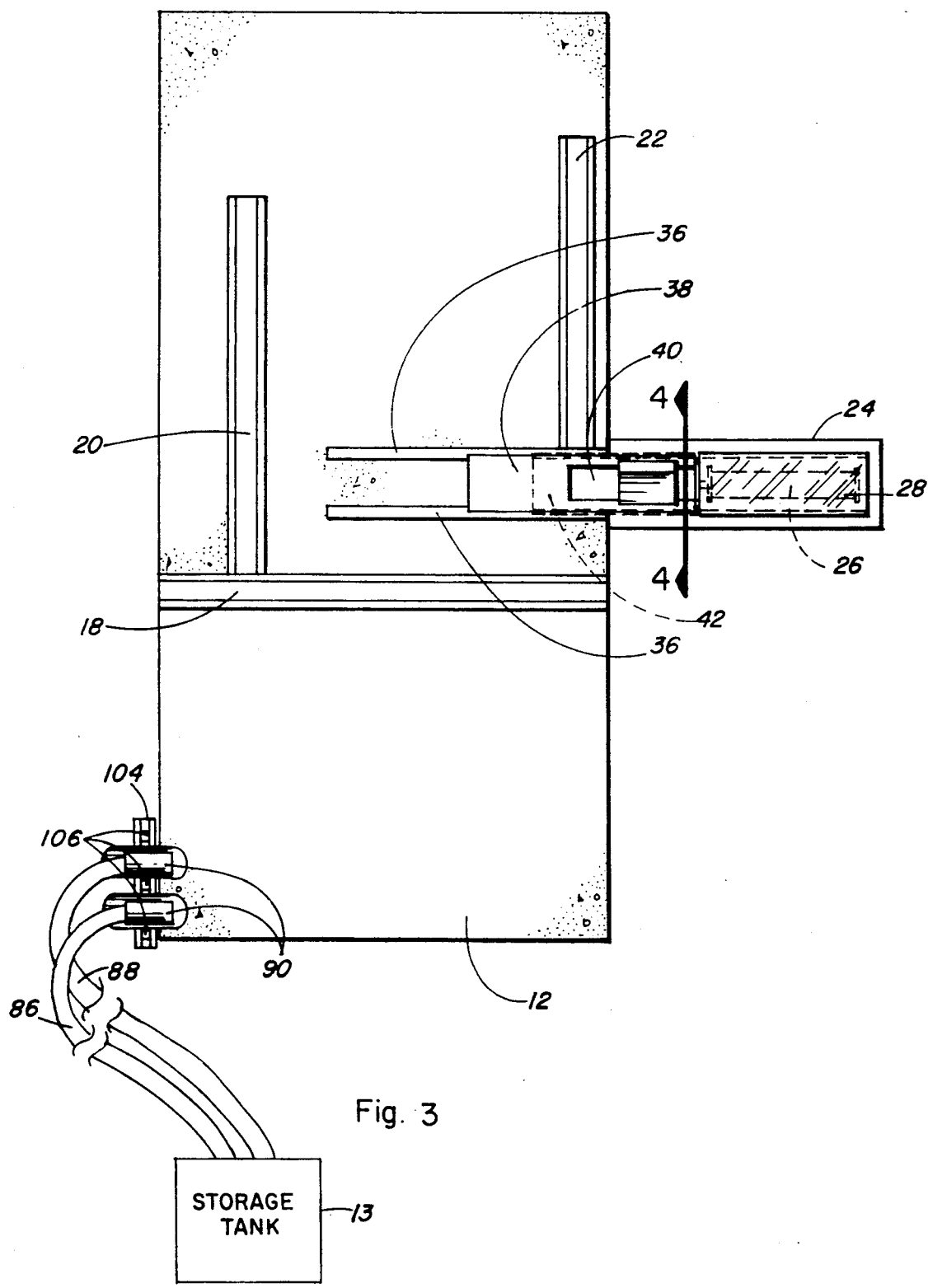
FIG. 3 is a top plan view of the chock interlock system of the present invention.
Figure 4:
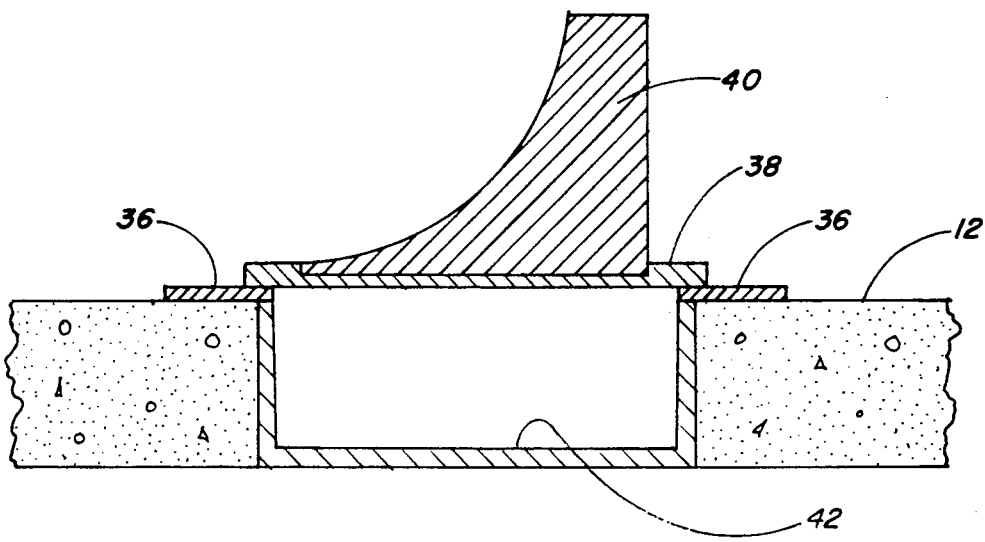
FIG. 4 is a cross-sectional view taken through the lines 4—4 of FIG. 2.

Operatively associated with the respective air switches 82 and 84 is a pair of nozzle cradles 108 and 110. As illustrated in the drawings, nozzle cradles 108 and 110 are adapted to receive and hold nozzle head 90 secured to a respective hose 86 and 88 that extends from a supply tank or storage tank 13 as illustrated in FIG. 3. As will be appreciated from subsequent portions of this disclosure, the respective nozzle cradles 108 and 110 are designed such that in a no load condition the air switches 82 and 84 remain in a normally open state. However, the loading of a cradle 108 or 110 with a hose nozzle 90 will cause a respective underlying air switch 82 or 84 to assume to closed position.

Figure 5:
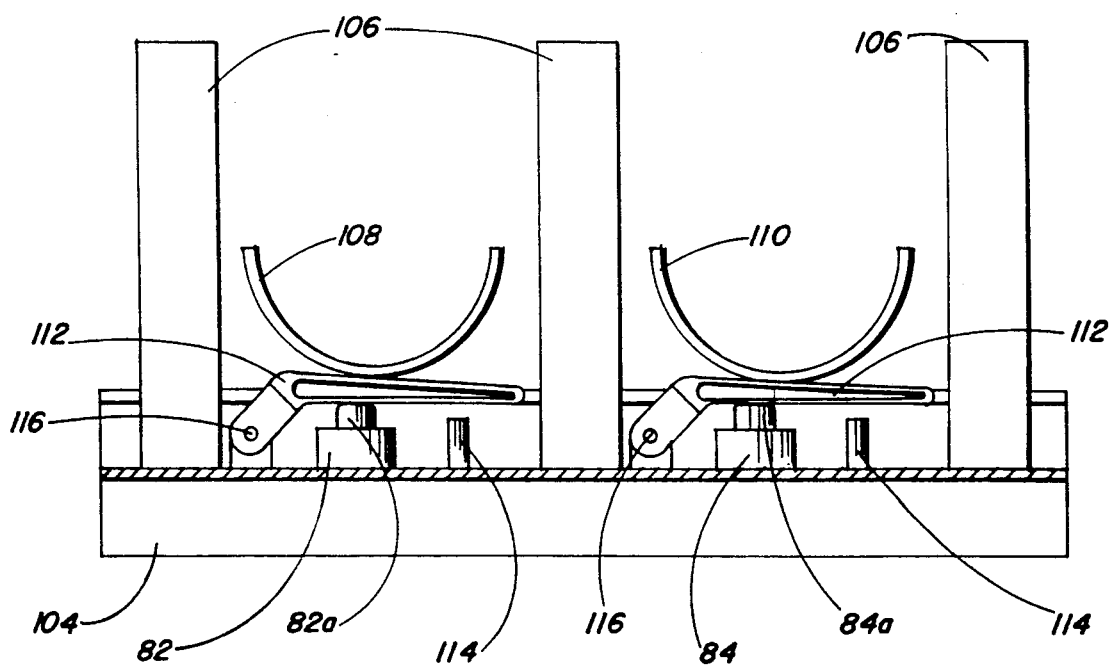
FIG. 5 is a side elevational view of two hose nozzle cradles and the support structure for supporting the same.

Viewing the cradle structure in more detail, and with particular reference to FIG. 5, there is shown therein what is referred to as a nozzle cradle assembly and such is indicated generally by the numeral 100. Nozzle cradle assembly 100 includes a main upstanding post 102 (FIG. 1) and secured to post 102 is a cross bar 104 that includes a series of laterally spaced post 106. Each nozzle cradle 108 or 110 is mounted between the respective posts 106. Note in FIG. 5 where there is a lever arm 112 that is pivotally mounted to the cross bar structure 104 via a pivot pin 116. It is seen that lever arm 112 extends over a button actuator 82a or 84a that forms a part of the air switch 82 or 84. In addition, secured to the cross bar 104 adjacent the air switch 82 or 84 is an upstanding stop 114 that limits the downward movement of the remote end of the lever arm 112. It is thusly appreciated that in the no load condition that is illustrated in FIG. 5, that the cradles 108 and 110 are empty and are not holding a hose nozzle 90. In this condition, the respective cradles 108 and 110 are of insufficient weight to depress the lever arm 112 so as to actuate or close the air switches 82 and 84. As seen in the drawings, the respective cradles 108 and 110 are secured or engage with the top of the lever arm 112.

One may close the air switch 82 and 84 by placing a hose nozzle 90 into a respective cradle. The weight of the hose nozzle will cause the lever arm 112 to be depressed and in the process will depress the button actuator 82a or 84a associated with the air switch 82 or 84. This, of course, results in the air switch 82 or 84 being closed and consequently the pressure switch 72 or 74 that is connected to that particular air switch is made to assume a deactivated mode or state.

In operation, when both cradles 108 and 110 are occupied by hose nozzle 90 such as illustrated in FIG. 2, the chock 40 assumes a retracted or inoperative state. In this position, the respective air switches 82 and 84 are closed and therefore the respective pressure switches 72 and 74 assume a deactivated mode. This means that control valve 50 assumes its normal position which is to pressurize line 60 causing the chock 40 to be retracted. See schematic illustration in FIG. 6.

Once either cradle 108 or 110 has its associated hose nozzle 90 removed, then the air switch 82 or 84 associated with that cradle is caused to be switched to the normally open position. That is, the removal of a hose nozzle 90 from a cradle 108 or 110 will cause the lever arm 112 to assume the position shown in FIG. 5. This opens the respective air switch 82 or 84 resulting in air from the air supply 52 being channeled through the air switch into a respective line that is directed to one of the pressure switches 72 and 74.

This will result in the actuation of a respective pressure switch 72 or 74 which will in turn actuate the main control valve 50 which will cause the same to be shifted such that line 58 is pressurized causing the chock 40 to be extended to its extended tire chocking position which is illustrated in FIG. 1. It is important to realize that it is not required that both cradles 108 or 110 be placed in the empty state. It is sufficient that only one cradle 108 or 110 is in the raised position shown in FIG. 5 in order for the chock interlock system of the present invention to be effective to extend the chock 40 to the extended tire chocking position.

As shown in FIG. 1, it is appreciated that the back curb or stop 18 tends to fix the gas truck 14 on the loading pad 12 such that when the tire chocking assembly 10 is extended that the tire chock 40 will come to a rest directly in front of a wheel of the gas truck. The design of the entire chock assembly 10 enables the tire chock assembly to smoothly slide into this chocking position.

From the foregoing discussion and specification, it is appreciated that the chock interlock system of the present invention is designed to provide a foolproof system for assuring that the gas truck 14 does not drive away from the loading ramp 12 with one or more hose nozzles 90 connected to the tank 16 carried by the vehicle.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An automatic tire chock interlock system for assuring that a gas truck does not drive away from a loading station with one or more supply lines are connected to a tank carried by the truck, comprising:
   a) a tire chock assembly having a tire chock movable between an extended tire locking position and a retracted position;
   b) control means associated with the tire chock assembly for moving the tire chock between the extended tire locking position and the retracted position;
   c) cradle means for receiving and holding at least one gas supply line from a main supply tank, the cradle means being movable between a first unoccupied position and a second occupied position where the cradle means holds the supply line;
   d) switch means associated with the cradle means and movable between off/on positions in response to the cradle means moving between the first and second positions; and
   e) actuator means operatively interconnected between the switch means and the control means associated with the tire chock assembly for actuating the control means and tire chock assembly such that when the cradle means assumes the first unoccupied position the tire chock is caused to assume the extended tire blocking position so as to prohibit the truck from being moved from the loading station and wherein when the cradle is occupied with the gas supply line from the supply tank the chock is retracted such that the gas truck may be moved away from the loading station.

2. The automatic tire chock interlock system of claim 1 wherein the cradle means includes two cradles for receiving two gas supply lines and wherein the actuator means and control means are operative to actuate the tire chock assembly such that when either cradle assumes an unoccupied position the tire chock is caused to assume the extended tire blocking position so as to prohibit the truck from being moved from the loading station and wherein when both cradles are occupied with the two gas supply lines from the supply tank the chock is retracted such that the gas truck may be moved away from the loading station.

3. The automatic tire chock interlock system of claim 1 wherein the tire chock assembly includes a fluid cylinder having a rod extending therefrom and wherein the chock is operatively connected to the rod.

4. The automatic tire chock interlock system of claim 1 including a wheel curb located on the loading station and spaced from the chock when the chock assumes the extended tire locking position such that the tire being chocked is situated between the chock and the wheel curve.

5. The automatic tire chock interlock system of claim 1 wherein the switch means includes at least one air switch that is actuated by the cradle means, and wherein the actuator means includes at least one pressure switch that is operatively connected to the air switch, and wherein the pressure switch is operatively connected to the control means associated with the tire chock assembly for actuating the control means.

6. An automatic tire chock interlock system for chocking at least one wheel of a gas truck to assure that the truck is not driven away from a loading station with one or more gas nozzles connected to a tank carried by the truck, comprising:
   a) a tire chock assembly including a double acting fluid cylinder that includes opposed ends and a rod extending therefrom, the tire chock assembly having a tire chock operatively associated with the cylinder rod such that the cylinder rod may move the chock from an extended tire chocking position to a retracted position;
   b) a fluid control valve operatively connected to the fluid cylinder for selectively directing fluid to either end of the fluid cylinder to extend or retract the rod and chock;
   c) a pair of cradles for receiving a pair of gas hose nozzles extending from a storage tank;
   d) an air switch associated with each cradle and movable between on/off positions in response to a gas hose nozzle being placed on an associated cradle or removed from an associated cradle such that the air switch is actuated and deactuated by placing the gas hose nozzle on and off the associated cradle;
   e) valve actuator means having a pair of pressure switches connected in parallel with each pressure switch being operatively connected to a respective air switch such that each air switch is operative to actuate a respective pressure switch;
   f) each pressure switch in turn being operatively connected to the control valve for actuating the same, the pressure switches being operative to shift the control valve between two positions for effectively extending and retracting the tire chock; and
   g) wherein the air switches, pressure switches, and control valve are operatively connected such that the tire chock may assume the retracted position only when both gas hose nozzles are stationed on the cradles and wherein the tire chock will assume an extended tire chocking position when either gas hose nozzle is removed from its cradle.

7. The automatic tire chock interlock system of claim 6 wherein the system includes a back tire stop situated rearwardly of the tire chock when the chock assumes an extended tire chocking position for positioning the wheel to be chocked.

8. The automatic tire chock interlock system of claim 6 wherein the fluid cylinder is an air cylinder, and wherein there is provided an air supply operatively connected to the control valve and to the respective air switches.

9. The automatic tire chock interlock system of claim 6 wherein the air switches are normally open and assume the normal open position when the cradles are free of a respective gas hose nozzle, and wherein in the normal open position a respective air switch is operative through its associated pressure switch to assure that the tire chock assumes an extended tire chocking position and wherein the tire chock may assume the retracted position only when both air switches are closed.

10. The automatic tire chock interlock system of claim 6 wherein the tire chock assembly includes a generally flat plate secured to the cylinder rod and wherein the tire chock is mounted on the flat plate, and wherein the system includes a loading pad that has a trough formed therein and wherein there is provided a pair of plate guides mounted on the loading pad adjacent the trough for engaging and guiding the plate of the tire chock assembly as the same is reciprocated back and forth by the fluid cylinder.

11. An automatic tire chock interlock system for assuring that a gas truck does not drive away from a loading area with a gas hose from a storage tank connected to a tank carried by the gas truck comprising:
   a) a tire chock assembly having a tire chock movable between an extended tire locking position and a retracted position;
   b) means for sensing the presence a absence of the storage tank gas hose at a location remote from the tank carried by the gas truck; and
   c) control means operatively innerconnected between the tire chock assembly and the sensing means for actuating the tire chock assembly in response to the sensing means detecting the presence or absence of the storage tank's gas hose at the remote location, the control means being operative to extend the chock to the tire locking position in response to the sensing means determining that the storage tank's gas hose is not located in the selected remote location, and further the control means being operative to retract the chock to an inoperative position in response to the sensing means detecting that the storage tank's gas hose is in the selected remote location, whereby the gas truck is prohibited from leaving the loading area unless the storage tank's gas hose is properly situated in the selected remote location.

* * * * *